US006380282B1

(12) United States Patent
Sugimoto

(10) Patent No.: US 6,380,282 B1
(45) Date of Patent: *Apr. 30, 2002

(54) ELECTRICALLY CONDUCTIVE PLASTIC MOLDED ARTICLE AND METHOD OF PRODUCTION THEREOF

(76) Inventor: Ichiro Sugimoto, 1-1-26, Minami tsukushino, Machida-shi, Tokyo 194-0002 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,786

(22) PCT Filed: Mar. 24, 1998

(86) PCT No.: PCT/JP98/01279

§ 371 Date: Dec. 13, 1999

§ 102(e) Date: Dec. 13, 1999

(87) PCT Pub. No.: WO98/42782

PCT Pub. Date: Oct. 1, 1998

(30) Foreign Application Priority Data

Mar. 24, 1997 (JP) ............................................. 9-087289
May 26, 1997 (JP) ............................................. 9-149910

(51) Int. Cl.[7] .............................. C08L 1/02; C08K 7/00

(52) U.S. Cl. ......................... 524/15; 523/124; 523/128; 524/13; 524/14

(58) Field of Search ................................ 524/9, 13, 14, 524/35, 430, 431, 432, 433, 495, 496, 439, 440, 441, 15; 523/124, 128

(56) References Cited

U.S. PATENT DOCUMENTS 6,083,621 A * 7/2000 Sugimoto .................... 524/13

FOREIGN PATENT DOCUMENTS

| | | |
|---|---|---|
| EP | 0 786 803 | 6/1996 |
| EP | 0 786 496 | 7/1997 |
| GB | 1520844 | 8/1978 |
| JP | 61042556 | 1/1986 |
| JP | 03 000 757 | 1/1991 |
| JP | 07 118 499 | 5/1995 |
| JP | 8-231790 | 9/1996 |
| JP | 10231384 | 2/1998 |
| ZA | 9 206 598 | 6/1993 |

* cited by examiner

*Primary Examiner*—Peter Szekely
(74) *Attorney, Agent, or Firm*—Kilpatrick Stockton LLP

(57) ABSTRACT

A method of producing an electrically conductive plastic molded article comprising blending 1 to 40 we. % of content shell fiber powder obtained by dry compressing a fiber contained in the mesocarp of the coconut fruit and processing the resulting fiber mass to 98 to 59 we. % of a biodegradable plastic or a non-biodegradable plastic, and adding 1 to 20 we. % of an electrically conductive additive. A molded article eliminating electrostatic troubles due to electrical chargeability, and improving biodegradable plastic is used, can be obtained.

4 Claims, 1 Drawing Sheet

ELECTRICALLY CONDUCTIVE PLASTIC MOLDED ARTICLE AND METHOD OF PRODUCTION THEREOF

TECHNICAL FIELD

The present invention relates to an electrically conductive molded plastic article and to a method of production thereof, and more particularly it relates to a molded article an electrically conductive, biodegradable and non-biodegradable plastic having blended therein an electrically conductive additive and coconut shell fiber powder to increase electrical conductivity for improving antistatic properties and to a method of production thereof.

BACKGROUND ART

Generally, plastics have high electric resistance and articles made thereof are readily charged by abrasion or contact, and hence they give a shock to human body and cause fire to be induced upon discharge or cause various troubles for production or electrostatic troubles such as erroneous action of IC in electric components. To cope with these, surface treatment with antistatic agents or addition of a conductive substance to the plastics for the purpose of providing conductivity has been performed, in particular carbon black or surfactants have been kneaded upon molding.

However, when a large amount of conductive substance is kneaded in the plastics, the additive bleeds out to make the surface sticky, the localization of additive inhibits the original physical properties of the synthetic resin. Thus, since the amount of the additive usage is limited, the development of a material that exhibits conductivity with only a small amount of additive has been expected.

On the other hand, biodegradable plastics, whose decomposability by bacteria has recently been paid much attention from the viewpoints of prevention of environmental destruction, are used as a raw material mainly for throw-away articles such as agricultural articles, medical materials, or sporting goods as well as to daily necessaries depending on the material. Biodegradable plastics can give a bright aspects in the problem of disposal of plastics materials after use in that they are degraded in the soil, etc. and return to the nature. However, the speed of their biodegradation is unsatisfactory so that the development of means for improving its degradation has been desired.

DISCLOSURE OF THE INVENTION

Objects of the present invention is to promote the effect of conductive additive mixed to remove electrostatic troubles and prevent electrical charging by decreasing electric resistance and improve the degradation of the biodegradable plastics.

As means for solving the above-described two objects, the present inventors have focused on coconut shell fiber powder and completed the present invention.

That is, the present invention relates to an article molded of a plastic mixture comprising the following components:

(A) a plastic: 98 to 59% by weight, (B) a dry powder of a water-swelling fiber: 1 to 40% by weight, and (C) a conductive additive: 1 to 20% by weight (wherein the sum of (B) and (C) is 2 to 41% by weight).

In one embodiment, the present invention relates to the molded plastic article, wherein the plastic is a biodegradable plastic.

In another embodiment, the present invention relates to the molded plastic article, wherein the plastic is a non-biodegradable plastic.

In a still further embodiment, the present invention relates to the molded plastic article, wherein the dry powder of water-swelling fiber is a dry powder of coconut mesocarp fiber residue.

In still another embodiment, the present invention further relates to the molded plastic article, wherein the dry powder of coconut mesocarp fiber residue is a coconut shell fiber powder obtained by processing a dry compressed fiber mass of the coconut mesocarp to have a powder having a particle diameter of about 1 to 80 μm and further hot-air drying the powder to obtain a coconut shell fiber powder having a water content within a range of less than about 3% by weight.

In a further embodiment, the present invention relates to the molded plastic article, wherein the conductive additive is a powder selected from the group consisting of carbon black, carbon fiber, a carbon nano tube, cationic surfactant, non-ionic surfactant, and metal oxides.

Also, the present invention relates to a method of producing a conductive molded plastic article, comprising the steps of processing a dry compressed fiber mass of the coconut mesocarp to have a powder having a particle diameter of about 1 to 80 μm, further hot-air drying the powder to obtain a coconut shell fiber powder having a water content within a range of less than about 3% by weight, preparing a mixture of 98 to 60% by weight of the plastic and 1 to 40% by weight of the coconut shell fiber powder, and molding the resulting mixture into a desired article after blending the mixture with 1 to 20% by weight of a conductive additive.

Hereafter, the present invention will be described in detail.

First, the components of the molded plastic article of the present invention will be described.

<1> Plastic

As the plastic used in the molded plastic article of the present invention, either biodegradable plastics or non-biodegradable plastics may be used.

The biodegradable plastics used in the present invention are not limited particularly so long as they are those plastics degraded in the environment, particularly by the action of microorganism. More specifically, they include polylactic acid, polyhydroxyalkanoate (for example, 3-hydroxybutyric acid (PHB), 3-hydroxyvaleric acid (PHV)), lactone resins, aliphatic polyesters (polyester resins obtained from a low molecular weight aliphatic dicarboxylic acid and a low molecular weight aliphatic diol), complex materials such as cellulose acetate base, polycaprolactone base, complex materials such as modified starch, modified polyvinyl alcohol, etc., other complex materials, and the like.

Also, the non-biodegradable plastics are not limited particularly so far as they are plastics usually used in the production of molded plastic articles, including such as polyethylene, polypropylene, ABS, etc.

When the non-biodegradable plastics are used in the present invention, addition of a small amount of conductive additive can decrease the electric resistance of the plastics to prevent electrical charging. When the biodegradable plastics are used, the degradation of the biodegradable plastics can be improved in addition to the above-described effect.

(2) Dry Powder of Water-swelling Fiber

The dry powder of water-swelling fiber used in the present invention is a powder of a fiber whose volume increases when water is added thereto as compared with the dry state, and is not limited particularly so long as it has this property and can be used for molding of the plastic. In particular, it is preferred that it is biodegradable per se. Preferred dry powder of water-swelling fiber includes a dry powder of coconut mesocarp fiber residue (hereafter, also referred to as "coconut powder") More preferably, it is coconut shell fiber powder obtained by processing a dry compressed fiber mass of the coconut mesocarp to obtain a powder having a particle diameter of about 1 to 80 μm and hot-air drying the powder to make its water content within a range of less than about 3% by weight.

FIG. 1 is a side cross-sectional view of a coconut fruit. Coconut is produced in the tropics and in the fruit (1), fiber contained in the mesocarp (1*a*) (hereafter, referred to as a coconut shell fiber) is light in weight and resilient, and the compressed and dried one has a property that it is expanded to 5 to 6 times in volume when water is added thereto.

The coconut powder used in the present invention, more specifically, is produced as described below. That is, to obtain the coconut powder, the coconut mesocarp is exposed to fresh water to dissolve the coconut sarcocarp and thereafter collecting only a fiber, exposing the fiber to sun light for 1 to 3 years, preferably for 2 years or more, to remove the salt contents and tannin, and further forcible drying by hot air for about 8 hours to reduce its water content within a range of about 10%. Then, fine fragments of the fiber (fiber residue) were obtained, which were compressed subjected to compression treatment using a press machine or the like at a compression ratio of 4:1 to 6:1. The removal of salt portion and tannin may be performed after the fine fragments of fiber are obtained.

The size of coconut powder is not limited particularly but is desirably set to a particle diameter in a range of 1 to 80 μm from the standpoint of the appearance of a plastic molded article containing it and the energy cost required for grinding, and the like.

Preferably, the fragments obtained as described above may be dried by a hot air (for example, 105° C.) for 5 to 8 hours to reduce the water content within a range of about 2 to 3%.

The coconut powder used in the present invention has the property that its volume increases to 5 to 6 times in volume when water is added thereto. This phenomenon is presumed to be attributed to the fact that coconut fiber residue powder shrinks to ¼ to ⅙ when it is dry compressed and the addition of water causes the compressed dry fiber to restore to the original shape. The property of swelling is presumed to provide strength useful for the promotion of degradation of biodegradable plastics. Further, the components (cellulose component and the like) contained in the coconut powder is considered to be liked by microorganism.

(3) Conductive Additive

The conductive additive is not limited particularly so long as it can provide conductivity when it is blended in the plastic and does not damage the properties of the plastic, but specifically includes carbon black, carbon fiber, carbon nano tube, cationic surfactant, nonionic surfactant or metal powders, etc. These conductive substances may be used alone or as mixtures of any two or more.

(4) Other Optional Components

In the biodegradable molded plastic article of the present invention may be blended other components in addition to the above-described components.

For example, in order to achieve desired properties, plastics additives that are standard in the field of art may be added. For example, a surfactant may be added in order to increase the degree of processability or a coloring agent such as various types of pigments may be added in order to increase a commercial value. Also, agricultural chemicals may be added, if needed, to prevent the soil from noxious insects, the properties of base plastics may be altered by use of polymerization adjusters such as crosslinking agents, monomer derivatives, heteromonomers, curing agents, etc.

When the surfactant, the coloring agents and/or the agricultural chemicals are blended, the total amount of them would be within a range from 1 to 10% by weights.

Besides, the known antioxidants, inorganic fillers, antiblocking agents may also be blended. When these are blended, an amount corresponding to the total blending amount is to be subtracted from the blending amount of any one, two or three of the above-described (A), (B) and (C) before they can be blended.

To improve the dispersion of the coconut powder in the molded plastic article, it is possible to subject the coconut powder to surface treatment with a coupling agent such as a silane coupling agent.

<2> The Molded Plastic Article of the Present Invention and Method of Producing the Same The molded plastic article of the present invention can be obtained by molding a mixture containing the following components.

(A) a plastic: 98 to 59% by weight, (B) a dry powder of a water-swelling fiber: 1 to 40% by weight, and (C) an conductive additive: 1 to 20% by weight (wherein the sum of (B) and (C) is 2 to 41% by weight).

When a biodegradable plastic is used as raw materials, the plastic results in a biodegradable plastic molded article. On the other hand, when a non-biodegradable plastic is used as raw materials, the plastic results in a non-biodegradable plastic molded article. Depending on the purpose of use, a biodegradable plastic and a non-biodegradable plastic may be used in combination.

The production of the molded plastic article of the present invention can be performed as follows. The dry powder of water-swelling fiber is usually mixed in an amount of about 1 to 40% by weight per 98 to 59% by weight of the plastic and the resulting mixture is blended with 1 to 20% by weight of the conductive additive. The blending ratio of each component is expressed as a ratio to the total components. The respective components mixed as described above are heated (for example, at 150 to 200° C.), and after the melting, cooled to obtain pellets. For this operation, a kneading apparatus such as a Banbury mixer, a Henschel mixer, a single-screw kneader, a multi-screw kneader, a mixing roll, a kneader, or the like can be used advantageously.

Using the above-described pellets, the molded articles of the present invention can be obtained depending on the type, shape, film thickness, and the like in the form of intermediate materials such as hard or soft films, sheets, plate-like products, profiled products, wrapping materials, covering materials, foamed materials, etc., wrapping films for IC magazines, trays, electronic components, and electric components, separation plates for clean rooms, floorings or working stands in electric component factories, covers for measurement apparatuses, polarizing plates, liquid-crystal panels, electrode portions, etc. and in addition, intermediate or final molded articles including semiconductor sealants, electromagnetic shielding material, electric wave absorbing materials, electric wave transmitting materials, etc. as antistatic resources by adjusting the amount of conductive material's addition.

Upon production, a processing method such as calendering molding, casting processing or blow molding, vacuum molding, lining processing, etc. as well as injection molding and extrusion molding can be used under heating (for example, at 140 to 350° C.).

In the present invention, the dry powder of water-swelling fiber used in the production of molded plastic article is preferably the above-described coconut powder. A preferred embodiment of the production method of the conductive molded plastic article of the present invention comprises the steps of processing a dry compressed fiber mass of the coconut mesocarp to have a powder having a particle diameter of about 1 to 80 μm, further hot-air drying the powder to obtain a coconut shell fiber powder having a water content within a range of less than about 3% by weight, preparing a mixture of 98 to 60% by weight of the plastic and 1 to 40% by weight of the coconut shell fiber powder, and molding the resulting mixture into a desired article after blending the mixture with 1 to 20% by weight of an conductive additive.

The molded article of the present invention produced by the above-described method exhibits a remarkably decreased electric resistance of $10^{10}$ Ω/cm$^2$ when 1 to 40% by weight of the coconut powder is blended in contrast to plastics containing no coconut powder that have an electric resistance of $10^{10}$ Ω/cm$^2$ or more in general.

And, in addition to this, when the conductive additive is blended in an amount of 1 to 20% by weight, the electric resistance is $10^9$ Ω/cm$^2$ or less, thereby showing a further improved conductivity.

This is presumed to be attributed to the fact that the residual water in the coconut powder to be mixed in the plastic has a function of controlling humidity to reduce leak resistance of the surface of the molded article, resulting in the promotion of the effect of the conductive additive to improve its performance.

Also, in the case where the base of the plastic molded article is a biodegradable plastic, the biodegradability thereof is remarkably improved as compared with molded articles made of the conventional biodegradable plastic alone as a raw material when it is allowed to stand in the soil after use.

This is presumed to be attributed to the fact that since the coconut powder blended in the molded article of the present invention is a natural organic material, there are many microorganism that like it particularly in the soil and first such microorganism degrade the coconut powder components in early stages to destroy the shape of the molded article and then creates a situation in which other microorganisms that like the plastic can act vigorously.

By selecting the blending amount of the coconut powder in the biodegradable plastic, the period of time until the destruction of the shape of a product can be adjusted properly.

BEST EMBODIMENT OF THE INVENTION

Figure 1:
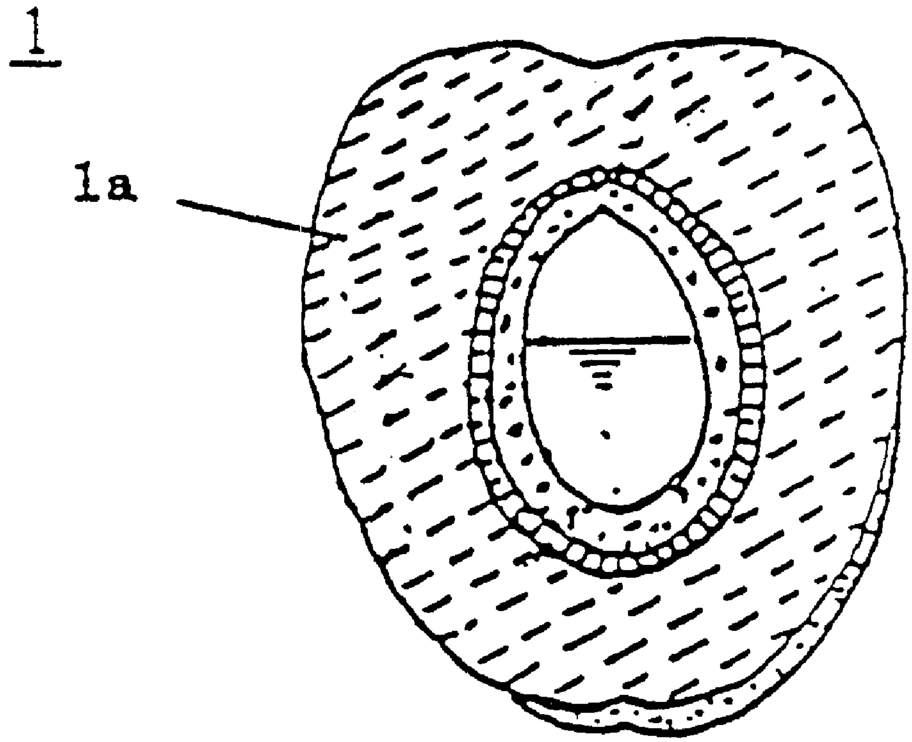
FIG. 1 is a cross-sectional view of a coconut.

Hereafter, the present invention will be described in detail by examples.

Production Example 1 Production of Coconut Powder

Mesocarp (1*a*) which remained after removing the endocarp and embryo from a coconut (1) was dipped in fresh water for 1 year to dissolve and remove the coconut sarcocarp, and fiber portion was collected. Then, the fiber portion was exposed to sun light for three years to remove salt contents and tannin and further subjected to forcible drying by a hot air at 105° C. for 8 hours to make the water content within a range of 10%. Then, then the fine fragments of 5 to 10 mm produced upon making a net using the fiber were collected, which were compressed to a compression ratio of 6:1 using a press. The compressed product thus obtained was pulverized using a jet mill and thereafter classified by a sieve to obtain a coconut powder passing 400 mesh. Scanning electron microscopic observation of the resulting coconut powder demonstrated that it had an average particle diameter of about 20 μm.

EXAMPLE 1

Production of Biodegradable Molded Plastic Article

A biodegradable aliphatic polyester obtained by synthesizing glycol and an aliphatic carboxylic acid in a weight ratio for 30:70 (manufactured by Showa Kobunshi Co., Ltd., product name "Bionore") and 5% by weight of the coconut powder obtained in the above-described production example and 1 to 15% by weight of carbon black were melt-mixed and granulated to obtain a material for producing a biodegradable molded plastic article. The blending amount of the biodegradable aliphatic polyester was adjusted so that the total amount will be 100% by weight. This material was inflation molded into a multifilm having a thickness of about 30 μm. Also, a multifilm containing no carbon black was produced in a similar way.

The above-described multifilms were tested for their degradation speed by embedding them in a compost. The tests were done under the conditions of a temperature of 45° C. and a maximum water volume of 50% in terms of a water content ratio. The multifilms were degraded to water and carbon dioxide by microorganism and was difficult to be recovered in 5 to 7 days, and their shape was completely disappeared on day 14.

Also, the surface specific resistance of the was measured and the results obtained are shown in Table 1. As a result, a remarkable decrease in surface resistance with an increased amount of carbon black was observed.

TABLE 1

| amount of carbon black (weight %) | The surface specific resistance (Ω) |
|---|---|
| 0 | $5.36 \times 10^{12}$ |
| 1 | $3.44 \times 10^{12}$ |
| 2 | $1.59 \times 10^{8}$ |
| 3 | $2.46 \times 10^{7}$ |
| 4 | $3.91 \times 10^{4}$ |
| 5 | $1.37 \times 10^{4}$ |
| 6 | $2.09 \times 10^{2}$ |
| 7 | $1.42 \times 10$ |
| 8 | $6.57 \times 10$ |
| 9 | $5.81 \times 10$ |
| 10 | $4.34 \times 10$ |
| 11 | $3.50 \times 10$ |
| 12 | $3.19 \times 10$ |
| 13 | $2.69 \times 10$ |
| 14 | $2.10 \times 10$ |
| 15 | $1.47 \times 10$ |

EXAMPLE 2

Production of Non-biodegradable Molded Plastic Article

A polypropylene, 5% by weight of the coconut powder obtained in the above-described production example and 4, 6 or 10% by weight of carbon black were melt-mixed and granulated to obtain materials for producing biodegradable plastic molded articles. The blending amount of the polypropylene was adjusted so that the total amount will be 100% by weight. These materials were inflation molded into multifilms having a thickness of about 30 μm. Also, a multifilm containing no carbon black was likewise produced.

The surface specific resistance of each multi-layered film was measured and the results obtained are shown in Table 1. It was observed that regardless of whether the plastic mixed was biodegradable or non-biodegradable, the coconut shell fiber powder acted as a promoter of decreasing the surface resistance of samples by the conductive substance mixed.

TABLE 2

| amount of carbon black (weight %) | The surface specific resistance (Ω) |
|---|---|
| 4 | $7 \times 10^4$ |
| 6 | $3 \times 10^3$ |
| 10 | $6 \times 10^2$ |

INDUSTRIAL APPLICABILITY

The conductive molded plastic article having blended therein coconut shell fiber powder according to the present invention can eliminate electrostatic troubles due to electrical chargeability, which is the defect of plastics, as a result of mixing a coconut powder having a small amount of residual water content and a conductive substance in a biodegradable or non-biodegradable plastic, and provide a molded article having improving biodegradability as well when the biodegradable plastic is used. fiber powder, and molding the resulting mixture into a desired article after blending the mixture with 1 to 20% by weight of a conductive additive.

What is claimed is:

1. An article molded of a biodegradable plastic mixture comprising the following components;

(A) a biodegradable plastic: 98 to 59% by weight, (B) a dry powder of a water-swelling fiber: 1 to 40% by weight, and (C) a conductive additive: 1 to 20% by weight (wherein the sum of (B) and (C) is 2 to 41% by weight).

2. The article as claimed in claim 1, wherein the dry powder of coconut mesocarp fiber residue is a coconut shell fiber powder obtained by processing a dry compressed fiber mass of the coconut mesocarp to have a powder having a particle diameter of about 1 to 80 μm and furher hot-air drying the powder to obtain a coconut shell fiber powder having a water content within a range of less than about 3% by weight.

3. The article as claimed in claim 1, wherein the conductive additive is a powder selected from the group consisting of carbon black, carbon fiber, a carbon nano tube, cationic surfactant, nonionic surfactant, and metal oxides.

4. A method of producing a conductive molded biodegradable plastic article, comprising the steps of processing a dry compressed fiber mass of the coconut mesocarp to have a powder having a particle diameter of about 1 to 80 μmm further hot-air drying the powder to obtain a coconut shell fiber powder having a water content within a range of less than about 3% by weight, preparing a mixture of 98 to 60% by weight of the biodegradable plastic and 1 to 40% by weight of the coconut shell fiber powder, and molding the resulting mixture into a desired article after blending the mixture with 1 to 20% by weight of a conductive additive.

* * * * *